United States Patent
Kang et al.

(10) Patent No.: US 10,294,378 B2
(45) Date of Patent: May 21, 2019

(54) METHOD FOR MANUFACTURING HYBRID PACKAGING MATERIAL

(71) Applicant: Korea Electrotechnology Research Institute, Changwon-si, Gyeongsangnam-do (KR)

(72) Inventors: Dong-jun Kang, Changwon-si (KR); Hoy-yul Park, Changwon-si (KR); Myeong-sang Ahn, Gimhae-si (KR)

(73) Assignee: Korea Electrotechnology Research Institute (KR)

( * ) Notice: Subject to any disclaimer, the term of this patent is extended or adjusted under 35 U.S.C. 154(b) by 592 days.

(21) Appl. No.: 14/082,328

(22) Filed: Nov. 18, 2013

(65) Prior Publication Data
US 2014/0076200 A1 Mar. 20, 2014

Related U.S. Application Data

(63) Continuation of application No. PCT/KR2013/001932, filed on Mar. 11, 2013.

(30) Foreign Application Priority Data

Mar. 14, 2012 (KR) .................. 10-2012-0026019

(51) Int. Cl.
| | | |
|---|---|---|
| C09D 183/04 | (2006.01) | |
| C09D 7/62 | (2018.01) | |
| C01B 33/145 | (2006.01) | |
| C01B 33/146 | (2006.01) | |
| C08G 77/02 | (2006.01) | |
| C08K 5/5419 | (2006.01) | |

(52) U.S. Cl.
CPC .............. *C09D 7/62* (2018.01); *C01B 33/145* (2013.01); *C01B 33/146* (2013.01); *C08G 77/02* (2013.01); *C08K 5/5419* (2013.01); *C09D 183/04* (2013.01)

(58) Field of Classification Search
CPC ...... C09D 183/04; C09D 7/1225; C09D 7/62; C01B 33/145; C01B 33/146; C08K 5/5419; C08G 77/02
See application file for complete search history.

(56) References Cited

U.S. PATENT DOCUMENTS 9,150,757 B2 * 10/2015 Massingill, Jr. ...... C04B 41/009

FOREIGN PATENT DOCUMENTS

| KR | 20100004280 | * | 1/2010 |
|---|---|---|---|
| KR | 20110053579 | * | 5/2011 |

* cited by examiner

*Primary Examiner* — David M Brunsman
(74) *Attorney, Agent, or Firm* — Park & Associates IP Law, P.C.

(57) ABSTRACT

Disclosed herein is a method of manufacturing a hybrid packaging material, comprising the steps of: (a) forming a colloidal inorganic nanosol; (b) surface-treating the inorganic nanosol of step (a) with an organic metal alkoxide containing an organic function group by stirring the inorganic nanosol together with the organic metal alkoxide; (c) replacing a solvent of the inorganic nanosol with an organic solvent different in type from the solvent to prepare an organic solvent-type inorganic nanosol; (d) substituting the organic solvent of the inorganic nanosol of step (c) with a functional organic monomer or a silicon compound, followed by concentration to prepare a solvent-free organic-inorganic hybrid material; and (e) adding a nanoclay dispersed in a solvent to the solvent-free organic-inorganic hybrid material.

20 Claims, No Drawings

METHOD FOR MANUFACTURING HYBRID PACKAGING MATERIAL

REFERENCE TO RELATED APPLICATIONS

This is a continuation of pending International Patent Application PCT/KR2013/001932 filed on Mar. 11, 2013, which designates the United States and claims priority of Korean Patent Application No. 10-2012-0026019 filed on Mar. 14, 2012, the entire contents of which are incorporated herein by reference.

FIELD OF THE INVENTION

The present invention relates to a method of manufacturing a hybrid packaging material. More particularly, the present invention relates to a method of manufacturing a hybrid packaging material applicable to electrical elements, electronic elements and energy elements, wherein an inorganic nanosol, such as an inorganic precursor sol or a water-based inorganic nanosol, is surface-treated, and an organic solvent included in the surface-treated inorganic nanosol is substituted with a functional organic monomer or a silicon compound and concentrated to prepare a hybrid packaging material which does not contract during a drying and curing reaction, or wherein a nanoclay dispersed in a solvent or a solvent-free nanoclay is added to prepare a hybrid packaging material.

BACKGROUND OF THE INVENTION

On the whole, inorganic materials have active applications in various fields including structural materials, coating materials for protection, and sealing (packaging) materials such as shielding and blocking films. This is, thanks to their excellent physical properties, inter alia, corrosion resistance, chemical resistance, wear resistance, heat resistance, hardness, and water and gas barrier properties. There is a strong need for expanding the application range of inorganic materials with such properties to electrical materials, electronic materials, information and energy materials, thus active research is ongoing.

Generally, inorganic materials require high-temperature and dry processes, which are high in unit cost, and are difficult to apply to the formation of thick films because of brittleness, and thus inorganic materials have many limitations in wet process applications. Further, the films to which the inorganic materials manufactured by a dry process are applied suffer from the disadvantage of having degraded packaging properties because of the presence of defects, such as pinholes, therein. In order to overcome the above limitations, research has recently been directed towards inorganic nano-sol in a colloidal phase, which allows for a wet process, and towards the dispersion of inorganic materials for use as wet materials.

A conventional inorganic nanosol, used as a structural material, has been used in binder mixture for the formation of films in a wet-coating process, with the aim of improving the films in terms of mechanical, thermal and chemical properties. However, the inorganic nanosol used as a structural material is too poor in purity to have applications in electrical, electronic, or information and energy fields. There is, therefore, a need for research into the development of inorganic nanosols of high purity while retaining the inorganic material's advantages, that is, high mechanical, thermal and chemical properties.

According to such a requirement, many methods for improving the purity of an inorganic nanosol have been proposed. Particularly, technologies for manufacturing a high-purity inorganic nanosol using metal alkoxide as a starting material have recently been developed.

The inorganic nanosol with high purity manufactured by these methods, can be used as electric and electronic, information, and energy materials, enjoying the advantage of allowing for a wet process because of its liquid phase. However, since it contains a solvent in a significant amount, a film coated with the nanosol may be prone to shrinkage during a drying and curing reaction, leading to degradation in dimensional stability, reproducibility and reliability. Thus, conventional inorganic nanosols are not suitable for use in passivation, molding, and terminal treatment, which require a wet material.

Further, in order to improve water and gas barrier capability which is an important physical property necessary for passivation, molding, terminal treatment or the like, it is required to control the shape, size and content of nanoparticles used in a coating film, and thus further research therefor is necessary.

SUMMARY OF THE INVENTION

Accordingly, the present invention has been devised to solve the above-mentioned problems, an object of the present invention is to provide a method of manufacturing a hybrid packaging material applicable to electrical elements, electronic elements and energy elements, wherein an inorganic nanosol, such as an inorganic precursor sol or a water-based inorganic nanosol, is surface-treated, and an organic solvent included in the surface-treated inorganic nanosol is substituted with a functional organic monomer or a silicon compound and concentrated to prepare a hybrid packaging material which does not contract during a drying and curing reaction, or wherein a nanoclay dispersed in a solvent or a solvent-free nanoclay is added to prepare a hybrid packaging material.

In order to accomplish the above object, an aspect of the present invention provides a method of manufacturing a hybrid packaging material, including the steps of: (a) forming a colloidal inorganic nanosol; (b) surface-treating the inorganic nanosol of step (a) with an organic metal alkoxide containing an organic function group by stirring the inorganic nanosol together with the organic metal alkoxide; (c) replacing a solvent of the inorganic nanosol with an organic solvent different in type from the solvent to prepare an organic solvent-type inorganic nanosol; and (d) substituting the organic solvent of the inorganic nanosol of step (c) with a functional organic monomer or a silicon compound, followed by concentration to prepare a solvent-free organic-inorganic hybrid material.

Another aspect of the present invention provides a method of manufacturing a hybrid packaging material, including the steps of: (a) forming a colloidal inorganic nanosol; (b) surface-treating the inorganic nanosol of step (a) with an organic metal alkoxide containing an organic function group by stirring the inorganic nanosol together with the organic metal alkoxide; (c) replacing a solvent of the inorganic nanosol with an organic solvent different in type from the solvent to prepare an organic solvent-type inorganic nanosol; (d) substituting the organic solvent of the inorganic nanosol of step (c) with a functional organic monomer or a silicon compound, followed by concentration to prepare a solvent-free organic-inorganic hybrid material; and (e) adding a nanoclay dispersed in a solvent to the solvent-free organic-inorganic hybrid material.

The inorganic nanosol may be a colloidal inorganic nanosol or water-based inorganic nanosol, which is formed by stirring an inorganic precursor in a solvent including water, said inorganic precursor being obtained through purification.

The inorganic precursor may be any one of metal alkoxide, metal acetate, metal nitrate and metal halide.

The inorganic nanosol may be any one of silica, alumina, magnesium oxide, titania, zirconia, tin oxide, zinc oxide, barium titanate, zirconium titanate, strontium titanate and a mixture thereof.

The solvent may be any one of water, alcohol and a mixture thereof.

The steps (a) and (b) may be performed by any one of room-temperature stirring, a supercritical reaction and a hydrothermal reaction.

The organic metal alkoxide may include an organic silane containing at least one functional group selected from the group consisting of an acrylic group, a methacrylic group, an allyl group, an alkyl group, a ketone group, an aromatic group, an ester group, a nitro group, a hydroxyl group, a cyclobutene group, an alkyd group, an urethane group, a mercapto group, a nitrile group, a vinyl group, an amine group, an epoxy group, and an acetyl acetone group.

The organic silane may be any one selected from the group consisting of trialkoysilanes, such as methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, n-butyltrimethoxysilane, n-butyltriethoxysilane, n-pentyltrimethoxysilane, n-hexyltrimethoxysilane, n-heptyltrimethoxysilane, n-octyltrimethoxysilane, vinyltrimethoxysilane, vinyltriethoxysilane, cyclohexyltrimethoxysilane, cyclohexyltriethoxysilane, phenyltrimethoxysilane, phenyltriethoxysilane, 3-chloropropyltrimethoxysilane, 3-chloropropyltriethoxysilane, 3,3,3-trifluoropropyltrimethoxysilane, 3,3,3-trifluoropropyltriethoxysilane, 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane, 3-mercaptopropyltrimethoxysilane, 3-mercaptopropyltriethoxysilane, 3-isocyanatepropyltrimethoxysilane, 3-isocyanatepropyltriethoxysilane, 3-glycidoxypropyltrimethoxylsilane, 3-glycidoxypropyltriethoxylsilane, 2-(3,4-epoxycyclohexyl)ethyltrimethoxysilane, 2-(3,4-epoxycyclohexyl)ethyltriethoxysilane, 3-(meth)acryloxypropyltrimethoxysilane, 3-(meth)acryloxypropyltriethoxysilane, 3-ureidopropyltrimethoxysilane, 3-ureidopropyltrimethoxysilane and mixtures thereof; dialkoxysilanes, such as dimethyldimethoxysilane, dimethyldiethoxysilane, diethyldimethoxysilane, diethyldiethoxysilane, di-n-propyldimethoxysilane, di-n-propyldiethoxysilane, di-1-propyldimethoxysilane, di-1-propyldiethoxysilane, di-n-butyldimethoxysilane, di-n-butyldiethoxysilane, di-n-pentyldimethoxysilane, di-n-pentyldiethoxysilane, di-n-hexyldimethoxysilane, di-n-heptyldimethoxysilane, di-n-heptyldiethoxysilane, di-n-octyldimethoxysilane, di-n-octyldiethoxysilane, di-n-cyclohexyldimethoxysilane, di-n-cyclohexyldiethoxysilane, diphenyldimethoxysilane, diphenyldiethoxysilane and mixtures thereof; and mixtures of trialkoxysilanes and dialkoxysilanes.

The organic solvent replaced in step (c) may be any one selected from the group consisting of alcohols, glycols and cellosolves.

The glycol may be any one selected from the group consisting of ethylene glycol, propylene glycol, polyethylene glycol, diethylene glycol, triethylene glycol, glycol ether, glycol ether ester, alipolyethylene dioxide, ethyleneglycol diformate, propyleneglycol alginate, propyleneglycol methyl ether propionate, ethyleneglycol diethyl ether, propoxylated neopentyl glycol diacrylate, chlorinated polyethylene, aliamyl glycolate, diethyleneglycol monoethyl ether, neopentyl glycol dimethacrylate, neopentylene glycol, aliamyl glycolate, butyl glycol, monoethylene glycol, dipropylene glycol monomethyl ether, propylene glycol methyl ether acetate, neopentyl glycol diacrylate, propylene glycol monomethyl ether, tetraethylene glycol, ethylene golycol ether acetate, ethylene glycol dibutyl ether, dipropylene glycol diacrylate, butylene glycol dimethacrylate, diethylene glycol ethyl ether, tripropylene glycol diacrylate, diethylene glycol monobutyl ether, tetraethylene glycol dimethacrylate, ethylene glycol dimethacrylate, triethylene glycol dimethacrylate, and triethylene glycol monomethyl ether.

The cellosolve may be any one selected from the group consisting of ethylene glycol monomethyl ether, ethylene glycol monoethyl ether, ethylene glycol monopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol monobutyl ether, ethylent glycol dimethyl ether, ethylene glycol diethyl ether, ethylene glycol dibutyl ether, ethylene glycol methyl ether acetate, ethylene glycol monoethyl ether acetate, and ethylene glycol monobutyl ether acetate.

The functional organic monomer of step (d) is an organic monomer containing one or more of thermo- and photo-polymerizable vinyl group, allyl group, acrylic group, methacrylate group, epoxy group, amino group and amide group, or is an organic monomer containing at least one of thermo- and photo-polymerizable organic functional groups.

When the functional organic monomer is a thermocurable monomer, a thermoinitiator is added, and the thermoinitiator may be at least one selected from the group consisting of an azo-based thermoinitiator, a cyanovaleric acid-based thermoinitiator, a potassium sulfate-based thermoinitiator and a peroxide-based thermoinitiator.

When the functional organic monomer is a photocurable monomer, a photoinitiator is added, and the photoinitiator may be at least one selected from the group consisting of a benzoic ether-based photoinitiator, a benzyl ketal-based photoinitiator, a dialkoylacetophenone-based photoinitiator, a hydroxyalkylphenone-based photoinitiator and an aminoalkylphenone-based photoinitiator.

The silicon compound of step (d) may be an organic-inorganic hybrid material having a straight-chain, branched-chain or cyclic hydrocarbon group at any one of four bonding sites of a silicon atom while having siloxane (—Si—O—) as a basic structure, and the cyclic hydrocarbon group may include at least one selected from the group consisting of an alkyl group, a ketone group, an acrylic group, a methacrylic group, an allyl group, an alkoxy group, an aromatic group, an amino group, an ether group, an ester group, a nitro group, a hydroxyl group, a cyclobutene group, a carboxyl group, an alkyd group, an urethane group, a vinyl group, a nitrile group, hydrogen, and an epoxy group, and the hydrogen of the cyclic hydrocarbon group may be substituted with fluorine.

The method may further include the step of mixing a thermocurable or photocurable polymer without a solvent after step (d).

The thermocurable polymer may be any one selected from organic polymers containing at least one of thermopolymerizable organic functional groups such as a vinyl group, an acrylic group, an epoxy group, an amino group and an amide group and thermocurable organic functional groups at opposite ends of the backbone of the polymer or a side chain of the polymer.

The thermocurable polymer is thermocured in a presence of a thermoinitiator, said thermoinitiator being selected from the group consisting of an azo-based thermoinitiator, a cyanovaleric acid-based thermoinitiator, a potassium sulfate-based thermoinitiator, a peroxide-based thermoinitiator, and a combination thereof.

The photocurable polymer may be any one selected from among organic polymers containing at least one of photopolymerizable organic functional groups including a vinyl group, an ally group, an acrylic group and a methacrylate group and photocurable organic function groups.

The photocurable polymer is photocured in a presence of a photoinitirator, said photoinitiator being selected from the group consisting of a benzoic ether-based photoinitiator, a benzyl ketal-based photoinitiator, a dialkoylacetophenone-based photoinitiator, a hydroxyalkylphenone-based photoinitiator and an aminoalkylphenone-based photoinitiator, and a combination thereof.

The solvent-free hybrid material formed in step (d) is added with a nanoclay.

Therefore, according to this method, an inorganic nanosol, such as an inorganic precursor sol or a water-based inorganic nanosol, is surface-treated, and an organic solvent included in the surface-treated inorganic nanosol is substituted with a functional organic monomer or a silicon compound and concentrated to prepare a hybrid packaging material which does not contract during a drying and curing reaction, or a solvent-dispersed nanoclay or a solvent-free nanoclay is added to prepare a hybrid packaging material. The hybrid packing material manufactured by this method is applicable to electrical elements, electronic elements and energy elements.

According to the present invention, an inorganic nanosol formed of high-purity inorganic precursor obtained through purification or a water-based inorganic nanosol is surface-treated, and an organic solvent included in the surface-treated inorganic nanosol is substituted with a functional organic monomer or a silicon compound and concentrated to prepare a solvent content-controllable organic-inorganic hybrid packaging material, and, if necessary, the solvent content-controllable organic-inorganic hybrid packaging material is mixed with a polymer to prepare various kinds of solvent content-controllable organic-inorganic hybrid packaging materials.

Meanwhile, nanoclay particles are dispersed in a solvent-free hybrid packaging material to prepare a hybrid packaging material applicable to electrical elements, electronic elements and energy elements. Therefore, the organic-inorganic hybrid packaging material of the present invention does not include a solvent or can control the content of a solvent, so it does not contract during a drying and curing reaction, thereby improving the dimensional stability, reproducibility and reliability of a film coated with this hybrid packing material.

Further, the hybrid packaging material according to the present invention is applied to sealing materials and terminal materials in the field of energy devices, such as photoelectric devices, cells, LEDs, etc., thus improving the efficiency of the devices and increasing the lifespan thereof. Particularly, this hybrid packaging material can be produced in large quantities at low cost by a wet process.

DETAILED DESCRIPTION OF THE INVENTION

Hereinafter, the present invention will be described in more detail with reference to the following Examples. However, these Examples are set forth to illustrate the present invention, and the scope of the present invention is not limited thereto.

Example 1

In Example 1, prior to the preparation of a solvent-free organic-inorganic hybrid material, a colloidal inorganic nanosol is to be prepared.

As the colloidal inorganic nanosol, a commercially available water-based colloidal inorganic nanosol or a colloidal inorganic nanosol formed by adding a solvent including water to an inorganic precursor obtained through purification may be used. In Example 1, a colloidal silica nanosol will be prepared.

450 mL of ethanol (ETON) as a solvent, 10.0 mL of ammonium hydroxide (PH 12) and 2.5 mL of distilled water were mixed and stirred for 10 min to obtain a mixed solution. Then, 10.5 mL of tetramethylorthosilicate (hereinafter referred to as TMOS) was added to the mixed solution and then stirred at room temperature for 24 hr to obtain a high-purity colloidal silica nanosol.

In order to surface-treat the colloidal silica nanosol for the purpose of improving the stability thereof, methyltrimethoxysilane (hereinafter referred to as MTM) and methacrylpropyltrimethoxysilane (hereinafter referred to as MPTMS) were used as surface treatment agents. Here, the MTMS was used in a primary surface treatment, and the MPTMS was used in a secondary surface treatment.

The MTMS and MPTMS were added to the colloidal silica nanosol such that the ratio of TMOS:MTMS and the ratio of TMOS:MPTMS are 10:1, respectively, and then the colloidal silica nanosol was stirred for 24 hr to prepare a high-purity colloidal silica nanosol surface-treated with the MTMS and MPTMS.

Next, for the purpose of improving the stability the high-purity colloidal silica nanosol surface-treated with the MTMS and MPTMS, the solvent included therein was replaced by methoxy ethanol (cellosolve) as an organic solvent, thus obtaining an organic solvent type silica nanosol.

Then, the organic solvent (methoxy ethanol) included in the organic solvent type silica nanosol was substituted with a functional organic monomer (trimethylpropane triacrylate (TMPTA)) or a silicon compound.

The process of substituting methoxy ethanol as an organic solvent with trimethylpropane triacrylate (functional organic monomer) was performed using the difference in boiling point between methoxy ethanol and trimethylpropane triacrylate. That is, in the process, methoxy ethanol was substituted with trimethylpropane triacrylate (functional organic monomer) by volatilizing the methoxy ethanol using the difference in boiling point therebetween.

Subsequently, organic-inorganic hybrid materials were respectively prepared by substituting an organic solvent with trimethylpropane triacrylate (functional organic monomer) and concentrating the resulting product at the following weight ratios:

silica sol: 0%, trimethylpropane triacrylate: 100%,
silica sol: 5%, trimethylpropane triacrylate: 95%,
silica sol: 10%, trimethylpropane triacrylate: 90%,
silica sol: 15%, trimethylpropane triacrylate: 85%,
silica sol: 20%, trimethylpropane triacrylate: 80%,
silica sol: 25%, trimethylpropane triacrylate: 75%,
silica sol: 30%, trimethylpropane triacrylate: 70%.

Then, the test for measuring the transmittances of the prepared organic-inorganic hybrid materials to the content of silicon nanosol were carried out, and the results thereof are summarized in Table 1 below.

TABLE 1

| Content of silica nanosol (%) | 0 | 5 | 10 | 15 | 20 | 25 | 30 |
|---|---|---|---|---|---|---|---|
| Transmittance (%) | 91 | 91 | 92 | 92 | 92 | 92 | 92 |

In this test, each of the solvent-free organic-inorganic hybrid materials having different silica nanosol contents was applied onto a quartz substrate to a thickness of 10 μm to form a film, and then the transmittance of the film was measured using a UV-Visible spectroscopy.

As given in Table 1, the solvent-free organic-inorganic hybrid materials exhibit high transmittance of 90% or more regardless of the content of silica nanosol. Here, the content of a comparative solvent-free organic-inorganic hybrid material is 0%.

Example 2

Among the solvent-free organic-inorganic hybrid materials prepared in Example 1, it was tested whether or not the solvent-free organic-inorganic hybrid material containing 30% of silica sol and 70% of trimethylpropane triacrylate was cracked.

The solvent-free organic-inorganic hybrid material (silica sol: 30%, trimethylpropane triacrylate: 70%) was prepared by adding azobisisobutyronitrile (hereinafter referred to as AIBN) as a thermoinitiator to a solvent-free acrylic organic monomer-dispersed silica nanosol such that the weight ratio of AIBN to solid trimethylpropane triacrylate (acrylic organic monomer) is 3 wt % and then hybridizing the silica nanosol with an epoxy resin as an organic polymer.

The prepared solvent-free organic-inorganic hybrid material was applied between upper and lower glass substrates, the upper and lower glass substrates were thermally pressed to be attached to each other, and then the adhesivity therebetween was tested. From the test, it can be ascertained that a dimensional change, such as coating surface contraction or the like, did not occur in spite of short-term thermal pressing and that the adhesivity between the upper and lower glass substrates was maintained without separating the upper and lower glass substrates from each other. Further, the prepared solvent-free organic-inorganic hybrid material was applied and then cured to form a thin film and a thick film, and then whether or not the film was cracked was evaluated.

Table 2 below shows the results of evaluating whether or not the coating film formed of the solvent-free organic-inorganic hybrid material was cracked with respect to the thickness thereof.

TABLE 2

| | Thickness (μm) | | | | |
|---|---|---|---|---|---|
| | 5 | 25 | 50 | 75 | 100 |
| Cracked (O, X) | X | X | X | X | X |

As shown in Table 2 above, it can be ascertained that the coating film formed of the solvent-free organic-inorganic hybrid material was not cracked even when the thickness thereof is several tens of micrometers or more.

Here, among the solvent-free organic-inorganic hybrid materials, only the solvent-free organic-inorganic hybrid material containing 30% of silica sol and 70% of trimethylpropane triacrylate was evaluated, but it can ascertained that similar results can be obtained even when the content ratio of silica sol is changed.

As described above, the thin film and thick film can be formed using the solvent-free organic-inorganic hybrid material in a short curing time without cracking. Further, when the contraction rate of the film is minimized, the solvent-free organic-inorganic hybrid material can be used as a sealing material and a terminal material in the field of energy device such as photoelectric devices, cells, LEDs and the like, and thus it will be expected to contribute to the improvement in efficiency of a device by minimizing the contraction rate thereof.

Example 3

The acryl/silica sol-dispersed solvent-free organic-inorganic hybride material (silica sol: 30%, trimethylpropane triacrylate: 70%) prepared in the same manner as in Example 1 was mixed with 5~30 wt % of nanoclay, and was then ultrasonically dispersed for 1 hr to prepare a solvent-free hybrid material uniformly dispersed with TMPTA, silica nanosol and nanoclay.

Table 3 below shows the thickness, optical transmittance and crack occurrence of the prepared acryl-silica-nanoclay-dispersed hybrid material.

TABLE 3

| Composition (acryl:silica:nanoclay) | Thickness | Transmittance (%) | Crack occurrence |
|---|---|---|---|
| 7:3:0.5 | ~50 μm | 88% | x |
| 7:3:1 | ~50 μm | 85% | x |
| 7:3:1.5 | ~50 μm | 83% | x |
| 7:3:2 | ~50 μm | 80% | x |
| 7:3:2.5 | ~50 μm | 77% | x |
| 7:3:3 | ~50 μm | 75% | x |

As shown in Table 3 above, it can be ascertained that the acryl-silica-nanoclay-dispersed solvent-free hybrid material prepared in Example 3 has a high transmittance of 75% to 88%.

Further, the solvent-free hybrid material prepared in Example 3 does not cause cracks because nanoclays are dispersed therein, so it is determined that water and gas permeability can be remarkably improved. Further, this solvent-free organic-inorganic hybrid material can be used as a sealing material and a terminal material in the field of energy devices such as photoelectric devices, cells, LEDs and the like, and thus it will be expected to contribute to the improvement in efficiency of a device by minimizing the contraction rate thereof.

Example 4

The acryl/silica sol-dispersed solvent-free organic-inorganic hybride material (silica sol: 30%, trimethylpropane triacrylate: 70%) prepared in the same manner as in Example 1 was mixed with 5~30 wt % of nanoclay dispersed in xylene at a weight ratio of 10 wt %, and was then ultrasonically dispersed for 1 hr to prepare a solvent-free hybrid material uniformly dispersed with TMPTA, silica nanosol and nanoclay. Thereafter, the transmittance and crack occurrence of this solvent-free hybrid material were tested. The test results thereof are similar to those of the solvent-free hybrid material of Example 3.

Consequently, the solvent-free hybrid material prepared in Example 4 is characterized in that the thickness of a coating film can be controlled by controlling the amount of xylene (solvent) and in that process variables can be controlled during wet coating.

Heretofore, in Examples 1 to 4, solvent-free hybrid materials, each of which is formed by substituting methoxy ethanol (organic solvent) with trimethylpropane triacrylate (functional organic monomer), have been explained. However, hereinafter, a solvent-free hybrid material, which is formed by substituting methoxy ethanol (organic solvent) with a silicon compound, will be explained.

Example 5

First, a colloidal silica nanosol, as a colloidal inorganic nanosol, will be prepared.

450 mL of ethanol (ETON) as a solvent, 10.0 mL of ammonium hydroxide (PH 12) and 2.5 mL of distilled water were mixed and stirred for 10 min to obtain a mixed solution. Then, 10.5 mL of tetramethylorthosilicate (hereinafter referred to as TMOS) was added to the mixed solution and then stirred at room temperature for 24 hr to obtain a high-purity colloidal silica nanosol.

In order to surface-treat the colloidal silica nanosol for the purpose of improving the stability thereof, methyltrimethoxysilane (hereinafter referred to as MTM) and methacrylpropyltrimethoxysilane (hereinafter referred to as MPTMS) were used as surface treatment agents. Here, the MTMS was used in a primary surface treatment, and the MPTMS was used in a secondary surface treatment.

The MTMS and MPTMS were added to the colloidal silica nanosol such that the ratio of TMOS:MTMS and the ratio of TMOS:MPTMS are 10:1, respectively, and then the colloidal silica nanosol was stirred for 24 hr to prepare a high-purity colloidal silica nanosol surface-treated with the MTMS and MPTMS.

Next, for the purpose of improving the stability the high-purity colloidal silica nanosol surface-treated with the MTMS and MPTMS, the solvent included therein was replaced by methoxy ethanol (cellosolve) as an organic solvent, thus obtaining an organic solvent type silica nanosol.

Then, the organic solvent (methoxy ethanol) included in the organic solvent type silica nanosol was substituted with a silicon compound. In this case, as the silicon compound, oligosiloxane provided with a methacrylic group and a phenyl group was used.

The process of substituting methoxy ethanol as an organic solvent with oligosiloxane (silicon compound) provided with a methacrylic group and a phenyl was performed using the difference in boiling point between methoxy ethanol and oligosiloxane. That is, in the process, methoxy ethanol was substituted with oligosiloxane (silicon compound) provided with a methacrylic group and a phenyl by volatilizing the methoxy ethanol using the difference in boiling point therebetween.

Meanwhile, a solvent-free oligosiloxane-dispersed silica nanosol including 30% of silica sol and 70% of oligosiloxane by weight was prepared by substituting an organic solvent with oligosiloxane (silicon compound) provided with a methacrylic group and a phenyl and concentrating the resulting product.

Azobisisobutyronitrile (hereinafter referred to as AIBN) as a thermoinitiator was added to the prepared solvent-free oligosiloxane-dispersed silica nanosol such that the weight ratio of AIBN to solid oligosiloxane is 3 wt %. Then, this solvent-free oligosiloxane-dispersed silica nanosol containing the AIBN was applied onto a glass substrate by wet coating to form a film. The film was cured at 150° C. for 30 min, and then whether or not the film was cracked was evaluated with respect to the thickness thereof.

Table 4 below shows the transmittance and crack occurrence of the coating film formed of the solvent-free organic-inorganic hybrid material with respect to the thickness thereof.

TABLE 4

|  | Thickness (μm) | | | | |
|---|---|---|---|---|---|
|  | 5 | 25 | 50 | 75 | 100 |
| Cracked (○, X) | X | X | X | X | X |

As shown in Table 4 above, it can be ascertained that the coating film formed of the solvent-free organic-inorganic hybrid material was not cracked even when the thickness thereof is several tens of micrometers or more.

Further, the solvent-free organic-inorganic hybrid material containing the oligosiloxane-dispersed silica nanosol was applied onto a quartz substrate to a thickness of 10 μm to form a film, and then the transmittance of the film was measured using a UV-Visible spectroscopy. As given in Table 4, the solvent-free organic-inorganic hybrid materials exhibit a high transmittance of 90% or more regardless of the content of silica nanosol.

Table 5 below shows the transmittance of the coating film formed of the solvent-free organic-inorganic hybrid material according to the content of silica nanosol.

That is, organic-inorganic hybrid materials were respectively prepared by substituting an organic solvent with oligosiloxane (silicon compound) and concentrating the resulting product at the following weight ratios:

silica sol: 0%, oligosiloxane: 100%,
silica sol: 5%, oligosiloxane: 95%,
silica sol: 10%, oligosiloxane: 90%,
silica sol: 15%, oligosiloxane: 85%,
silica sol: 20%, oligosiloxane: 80%,
silica sol: 25%, oligosiloxane: 75%,
silica sol: 30%, oligosiloxane: 70%.

Then, the test for measuring the transmittances of the prepared organic-inorganic hybrid materials to the content of silicon nanosol were carried out, and the results thereof are summarized in Table 5 below.

TABLE 5

| Content of silica nanosol (%) | 0 | 5 | 10 | 15 | 20 | 25 | 30 |
|---|---|---|---|---|---|---|---|
| Transmittance (%) | 91 | 91 | 92 | 92 | 92 | 92 | 92 |

As shown in Table 5 above, it can be ascertained that the solvent-free organic-inorganic hybrid material prepared in Example 5 can obtain high transmittance of 90% or more regardless of the content of silica nanosol. Further, the thin film and thick film can be formed using the solvent-free organic-inorganic hybrid material in short curing time without cracking. Further, when the contraction rate of the film is minimized, the solvent-free organic-inorganic hybrid material can be used as a sealing material and a terminal material in the field of energy devices such as photoelectric devices, cells, LEDs and the like, and thus it will be expected to contribute to the improvement in efficiency of a device by minimizing the contraction rate thereof.

According to the method of manufacturing a hybrid packaging material of the present invention, an inorganic nanosol, such as an inorganic precursor sol or a water-based inorganic nanosol, is surface-treated, and an organic solvent included in the surface-treated inorganic nanosol is substituted with a functional organic monomer or a silicon compound and concentrated to prepare a hybrid packaging material which does not contract during a drying and curing reaction, or a solvent-dispersed nanoclay or a solvent-free nanoclay is added to prepare a hybrid packaging material. The hybrid packing material manufactured by this method is applicable to electrical elements, electronic elements and energy elements.

What is claimed is:

1. A method of manufacturing a hybrid packaging material, comprising the steps of:
    (a) mixing tetramethylorthosilicate (TMOS) to a solvent to form a colloidal inorganic nanosol;
    (b) performing a primary surface treatment of the inorganic nanosol by adding methyltrimethoxysilane (MTMS) to the inorganic nanosol and performing a secondary surface treatment of the inorganic nanosol by adding methacrylpropyltrimethoxysilane (MPTMS) to the inorganic nanosol;
    (c) replacing the solvent of the inorganic nanosol with an organic solvent different in type from the solvent to prepare an organic solvent-type inorganic nanosol; and
    (d) substituting the organic solvent of the inorganic nanosol of said step (c) with a functional organic monomer or a silicon compound followed by concentration to prepare a solvent-free organic-inorganic hybrid material.

2. The method of claim 1, wherein a ratio of MTMS and MPTMS added to the inorganic nanosol is 10:1.

3. The method of claim 2, wherein the organic solvent of the inorganic nanosol is substituted with a functional organic monomer or a silicon compound in said step (d) by volatilizing the organic solvent using difference of boiling points between the organic solvent and said substituting material.

4. The method of claim 3, wherein the organic solvent of the inorganic nanosol is substituted with a functional organic monomer or a silicon compound in said step (d) in a weight ratio in which said solvent-free organic-inorganic hybrid material exhibits a light transmittance rate of at least 90% at a thickness of 10 μm.

5. The method of claim 4, wherein the organic solvent of the inorganic nanosol is substituted with a functional organic monomer or a silicon compound in said step (d) such that the solvent-free organic-inorganic hybrid material is substantially free of the organic solvent.

6. The method of claim 5, wherein the steps (a) and (b) are performed by any one of room-temperature stirring, a supercritical reaction and a hydrothermal reaction.

7. The method of claim 4, wherein the organic solvent replaced in said step (c) is any one selected from the group consisting of alcohols, glycols and cellosolves.

8. The method of claim 7, wherein the glycol is any one selected from the group consisting of ethylene glycol, propylene glycol, polyethylene glycol, diethylene glycol, triethylene glycol, glycol ether, glycol ether ester, alipolyethylene dioxide, ethyleneglycol diformate, propyleneglycol alginate, propyleneglycol methyl ether propionate, ethyleneglycol diethyl ether, propoxylated neopentyl glycol diacrylate, chlorinated polyethylene, aliamyl glycolate, diethyleneglycol monoethyl ether, neopentyl glycol dimethacrylate, neopentylene glycol, aliamyl glycolate, butyl glycol, monoethylene glycol, dipropylene glycol monomethyl ether, propylene glycol methyl ether acetate, neopentyl glycol diacrylate, propylene glycol monomethyl ether, tetraethylene glycol, ethylene golycol ether acetate, ethylene glycol dibutyl ether, dipropylene glycol diacrylate, butylene glycol dimethacrylate, diethylene glycol ethyl ether, tripropylene glycol diacrylate, diethylene glycol monobutyl ether, tetraethylene glycol dimethacrylate, ethylene glycol dimethacrylate, triethylene glycol dimethacrylate, and triethylene glycol monomethyl ether.

9. The method of claim 7, wherein the cellosolve is any one selected from the group consisting of ethylene glycol monomethyl ether, ethylene glycol monoethyl ether, ethylene glycol monopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol monobutyl ether, ethylent glycol dimethyl ether, ethylene glycol diethyl ether, ethylene glycol dibutyl ether, ethylene glycol methyl ether acetate, ethylene glycol monoethyl ether acetate, and ethylene glycol monobutyl ether acetate.

10. The method of claim 7, further comprising the step of mixing a thermocurable or photocurable polymer to the solvent-free organic-inorganic hybrid material without a solvent after said step (d).

11. The method of claim 10, wherein the thermocurable polymer is any one selected from organic polymers containing at least one of thermopolymerizable organic functional groups such as a vinyl group, an acrylic group, an epoxy group, an amino group and an amide group and thermocurable organic functional groups at opposite ends of the backbone of the polymer or a side chain of the polymer.

12. The method of claim 11, wherein the thermocurable polymer is thermocured in a presence of a thermoinitiator, said thermoinitiator being selected from the group consisting of an azo-based thermoinitiator, a cyanovaleric acid-based thermoinitiator, a potassium sulfate-based thermoinitiator, a peroxide-based thermoinitiator, and a combination thereof.

13. The method of claim 10, wherein the photocurable polymer is any one selected from among organic polymers containing at least one of photopolymerizable organic functional groups including a vinyl group, an ally group, an acrylic group and a methacrylate group and photocurable organic function groups.

14. The method of claim 13, wherein the photocurable polymer is photocured in a presence of a photoinitirator, said photoinitiator being selected from the group consisting of a benzoic ether-based photoinitiator, a benzyl ketal-based photoinitiator, a dialkoylacetophenone-based photoinitiator, a hydroxyalkylphenone-based photoinitiator and an aminoalkylphenone-based photoinitiator, and a combination thereof.

15. The method of claim 7, further comprising a step of adding a nanoclay to the solvent-free organic-inorganic hybrid material.

16. The method of claim 7, wherein the alcohol is methoxy ethanol.

17. The method of claim 2, wherein the functional organic monomer of said step (d) is an organic monomer containing one or more of thermo- and photo-polymerizable vinyl group, allyl group, acrylic group, methacrylate group, epoxy group, amino group and amide group, or is an organic monomer containing at least one of thermo- and photo-polymerizable organic functional groups.

18. The method of claim 17, wherein, when the functional organic monomer is a thermocurable monomer, a thermoinitiator is added, and the thermoinitiator is at least one selected from the group consisting of an azo-based thermoinitiator, a cyanovaleric acid-based thermoinitiator, a potassium sulfate-based thermoinitiator and a peroxide-based thermoinitiator.

19. The method of claim 17, wherein, when the functional organic monomer is a photocurable monomer, a photoinitiator is added, and the photoinitiator is at least one selected from the group consisting of a benzoic ether-based photoinitiator, a benzyl ketal-based photoinitiator, a dialkoylacetophenone-based photoinitiator, a hydroxyalkylphenone-based photoinitiator and an aminoalkylphenone-based photoinitiator.

20. The method of claim 2, wherein the silicon compound of said step (d) is an organic-inorganic hybrid material having a straight-chain, branched-chain or cyclic hydrocarbon group at any one of four bonding sites of a silicon atom while having siloxane (—Si—O—) as a basic structure, and the cyclic hydrocarbon group includes at least one selected from the group consisting of an alkyl group, a ketone group, an acrylic group, a methacrylic group, an allyl group, an alkoxy group, an aromatic group, an amino group, an ether group, an ester group, a nitro group, a hydroxyl group, a cyclobutene group, a carboxyl group, an alkyd group, an urethane group, a vinyl group, a nitrile group, hydrogen, and an epoxy group, and the hydrogen of the cyclic hydrocarbon group is substituted with fluorine.

* * * * *